US010026583B2

(12) United States Patent
Hosea et al.

(10) Patent No.: US 10,026,583 B2
(45) Date of Patent: Jul. 17, 2018

(54) DISCRETE DYNODE ELECTRON MULTIPLIER FABRICATION METHOD

(71) Applicant: Harris Corporation, Melbourne, FL (US)

(72) Inventors: Joseph Hosea, Amherst, MA (US); Omar Hadjar, Rochester, NY (US)

(73) Assignee: HARRIS CORPORATION, Melbourne, FL (US)

(*) Notice: Subject to any disclaimer, the term of this patent is extended or adjusted under 35 U.S.C. 154(b) by 0 days.

(21) Appl. No.: 15/172,767

(22) Filed: Jun. 3, 2016

(65) Prior Publication Data

US 2017/0352515 A1 Dec. 7, 2017

(51) Int. Cl.
*G01T 1/185* (2006.01)
*H01J 9/12* (2006.01)
*H01J 43/26* (2006.01)

(52) U.S. Cl.
CPC .............. *H01J 9/125* (2013.01); *H01J 43/26* (2013.01)

(58) Field of Classification Search
CPC .. H01J 9/125; H01J 43/26; H01J 43/22; H01J 2201/32; H01J 43/045; H01J 43/28; H01L 2924/0002; H01L 2924/00; H01L 2225/1029; H01L 2225/107; H01L 23/49537; H01L 25/105; G01T 1/185; G01T 1/2935; H01R 12/62
See application file for complete search history.

(56) References Cited

U.S. PATENT DOCUMENTS 5,618,217 A * 4/1997 Then ........................ H01J 9/125 445/35
5,624,706 A * 4/1997 Goukassian ............ C23C 14/06 427/126.1
5,744,908 A * 4/1998 Kyushima ............... H01J 43/22 313/103 R
6,852,979 B1 * 2/2005 Kyushima ............. H01J 43/045 250/366
7,023,134 B2 * 4/2006 Shimoi ................... H01J 9/125 250/207
9,293,309 B2 * 3/2016 Shimoi ................... H01J 43/22
2002/0102870 A1 * 8/2002 Burns ............... H01L 23/49537 439/69
2009/0057548 A1 * 3/2009 Hidalgo .................. H01J 43/30 250/282
2015/0060685 A1 * 3/2015 Maad ...................... G01T 1/185 250/385.1

* cited by examiner

*Primary Examiner* — Tracie Y Green
(74) *Attorney, Agent, or Firm* — RatnerPrestia

(57) ABSTRACT

A process of fabricating a discrete-dynode electron multiplier (DDEM) including the steps of mounting an insulator block to a conductor block, and forming a series of ion-optics geometrical structures in the conductor block, each ion-optics geometrical structure having a smallest dimension of less than 1 millimeter. The forming step may be performed by electrical discharge machining (EDM), laser cutting, and/or water jet cutting.

10 Claims, 4 Drawing Sheets

DISCRETE DYNODE ELECTRON MULTIPLIER FABRICATION METHOD

BACKGROUND OF THE INVENTION

(1) Field of the Invention

This invention relates to fabrication methods for discrete dynode electron multipliers.

(2) Description of Related Art

There are two basic forms of electron multipliers that are commonly used in mass spectrometry, namely, a discrete-dynode electron multiplier (DDEM) and a continuous-dynode electron multiplier. This invention relates to DDEM's and methods for fabricating a DDEM.

As is disclosed in U.S. Pat. No. 7,723,680 to Hidalgo, which is incorporated by reference herein in its entirety, in a conventional DDEM, ions enter the electron multiplier and strike a dynode. In response, the dynode releases a plurality of electrons in response to each ion that strikes it. Those ions then pass to and strike another dynode. The second dynode then releases multiple electrons in response to each electron that strikes it. This process repeats for several stages of dynodes. The electrons are collected by a Faraday cup or plate at the output of the electron multiplier. An electrical current or pulse is generated in the Faraday cup or plate.

More particularly, FIG. 1, which is reproduced from U.S. Pat. No. 7,723,680, is a cross-sectional view of a conventional DDEM 108. By way of background to DDEMs generally, DDEM 108 includes a plurality of dynodes, represented by even numbers from 202 to 228 (sometimes referred to herein generally as "dynodes 202-228"), and electrode 230.

The plurality of dynodes 202-228 are polished metal electrodes that are electrically coupled to a power supply circuit. The plurality of dynodes are arranged in an electron cascading configuration to define an electron path, represented by even numbers from 232 to 258. Electron cascading involves a process by which electrons ejected from one dynode (e.g., dynode 202) cascade downstream along the electron path 232-258 (e.g., to dynode 204, and then to dynode 206, etc.). Dynodes 202-228 include a surface treatment that increases the ability of the dynode to emit secondary electrons.

An ion 200 originating from an ion source (not shown) is supplied to DDEM 108, which is interposed along the ion path. The ion is directed toward dynode 202 of the plurality of dynodes, and as a result impacts with dynode 202. The impact of ion 200 with dynode 202 causes dynode 202 to emit electrons. This process is referred to as secondary emission. Secondary emission is the process in which surface electrons present on the dynode are emitted from the dynode upon impact with the ion or an electron.

A power supply circuit is electrically coupled to the plurality of dynodes (e.g., D1-D14), and operates to charge the plurality of dynodes 202-228 with a potential that increases for each dynode 202 downstream along the electron path. For example, dynode 204 has a greater potential than dynode 206. As a result, an electric field is generated between dynode 202 and 204 that draws the electrons emitted from dynode 202 toward dynode 204, generally along path 232.

When the electrons from dynode 202 impact dynode 204, the energy of the electrons is sufficient to cause secondary emission at dynode 204. This secondary emission results in each electron causing dynode 204 to emit one or more electrons. Typically multiple electrons are emitted for each impact of an electron with one of the plurality of dynodes 202-228.

The power supply circuit generates a potential on dynode 206 that is greater than dynode 204, generating an electric field between dynode 204 and 206. The electric field causes the electrons emitted from dynode 204 to be drawn toward dynode 206, generally along path 234. The electrons impact with dynode 206, themselves causing a secondary emission of one or more electrons. Typically multiple electrons are emitted. This process continues along electron path 232-258, and acts to increasingly multiply the number of electrons moving along electron path 232-258 with each impact with a dynode. As a result, a single impact of ion 200 with dynode 202 can result in a large number of electrons moving along electron path 232-258.

Conventional DDEMs, such as those disclosed in U.S. Pat. Nos. 7,723,680 and 3,619,692, which are each incorporated by reference herein in their entirety, ordinarily comprise a large number of separate and discrete parts, which is disadvantageous from assembly, inventory and cost perspectives. There exists a need to enhance methods for fabricating DDEMs in the interest of streamlining manufacturing, assembly, inventory and costs.

BRIEF SUMMARY OF THE INVENTION

According to one aspect of the invention, a process for fabricating a discrete-dynode electron multiplier (DDEM) comprises the steps of mounting an insulator block to a monolithic conductor block, and forming a series of ion-optics geometrical structures in the monolithic conductor block. Each ion-optics geometrical structure has a smallest dimension of less than 1 millimeter. The ion-optics geometrical structures are designed to guide electrons to collide with a designated area of a dynode to generate electron multiplication. The structures can be designed for other various functions such as an input section, an electron collector, or an electron cloud splitter. The ion-optics geometrical structures may be a series of alternating fingers and slots in the monolithic conductor block, each finger and slot having a smallest dimension of less than 1 millimeter.

According to another aspect of the invention, a process of manufacturing a DDEM comprises the steps of mounting at least one insulator block to a monolithic conductor block; forming a series of ion-optics geometrical structures in the monolithic conductor block, each ion-optics geometrical structure having a smallest dimension of less than 1 millimeter; forming an opening in the monolithic conductor block; and connecting a circuit board to the DDEM by positioning a fastener through the opening in the monolithic conductor block and through an opening in the circuit board.

According to yet another aspect of the invention, a process for fabricating a DDEM comprises the steps of mounting a monolithic conductor block between two insulator blocks, and forming a series of ion-optics geometrical structures in the monolithic conductor block. Each ion-optics geometrical structure has a smallest dimension of less than 1 millimeter.

According to still another aspect of the invention, a method of fabricating a DDEM comprises the steps of providing a monolithic conductor block and ceramics block in any geometrical form (e.g., circular, L-shape, U-shape), and forming a series of ion-optics geometrical structures designed specifically to cause electrons to collide with a designated area of a dynode to generate electron multiplication. The structures can be designed for various other functions such as an input section, an electron collector, or an electron cloud splitter.

DETAILED DESCRIPTION OF THE INVENTION

Figure 1:
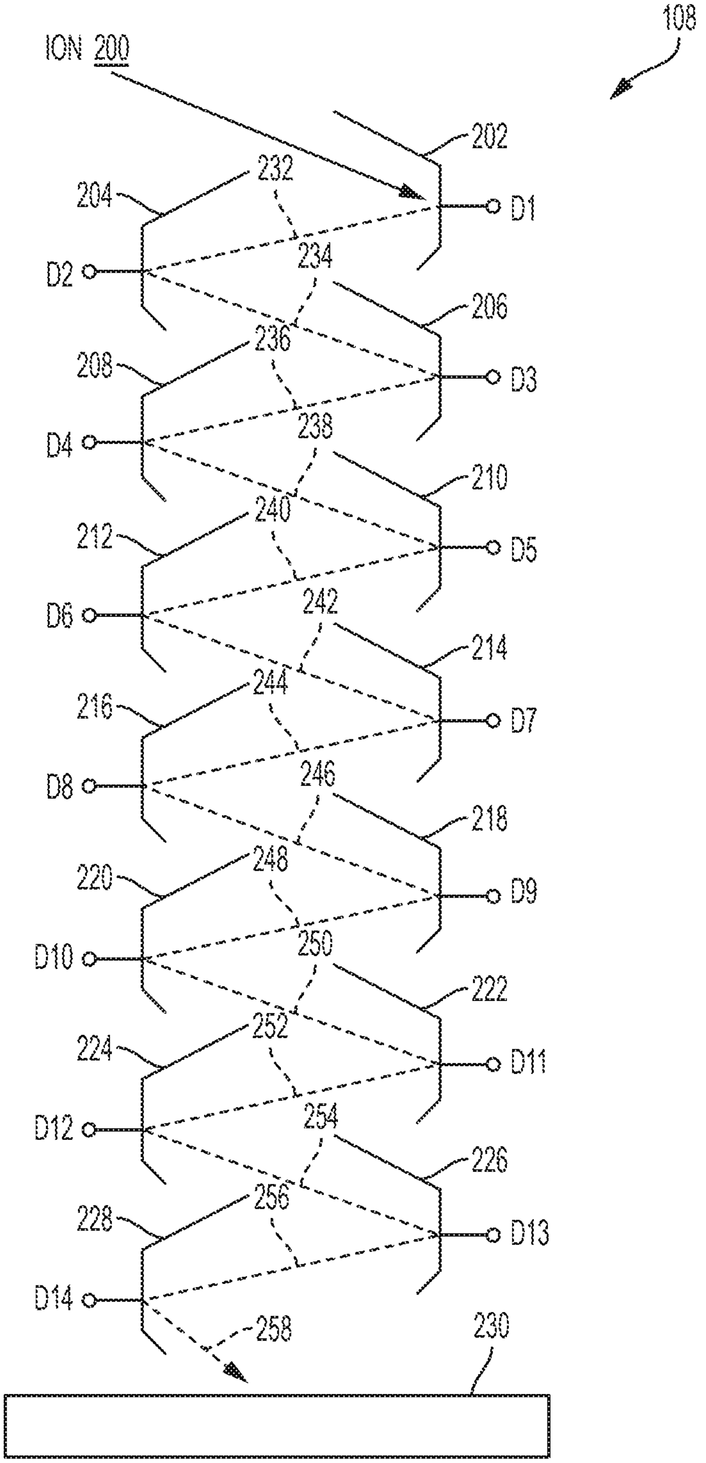
FIG. 1 depicts a schematic view of a conventional DDEM according to the prior art.
Figure 2:
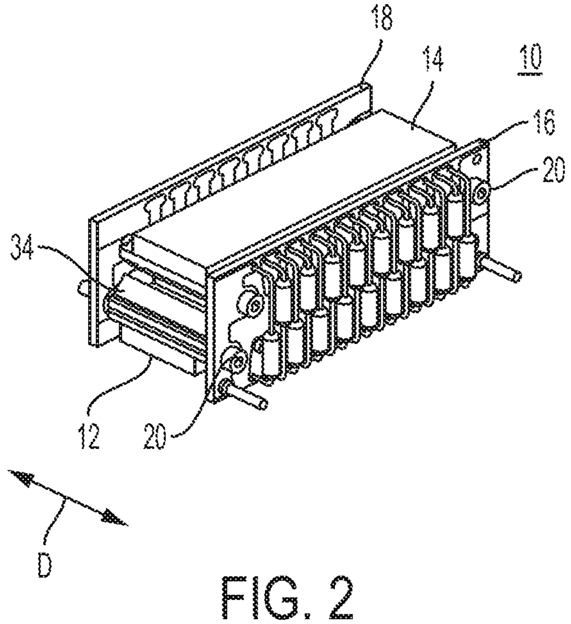
FIG. 2 depicts an assembled view of the DDEM, according to one exemplary embodiment of the invention.
Figure 3:
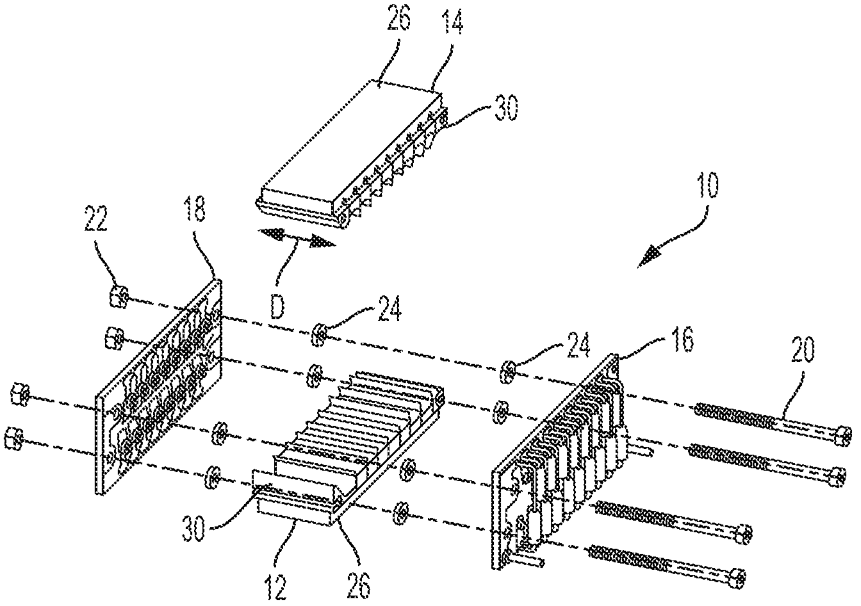
FIG. 3 depicts an exploded view of the DDEM of FIG. 2.

FIGS. 2 and 3 depict assembled and exploded views, respectively, of a discrete-dynode electron multiplier (DDEM) 10, according to one exemplary embodiment of the invention. DDEM 10 generally comprises a first anode array 12 spaced apart from a second anode array 14, and two circuit boards 16 and 18 that are fixedly mounted on opposing sides of the first anode array 12 and the second anode array 14 by four fasteners 20 and corresponding nuts 22 and washers 24.

Figure 4A:
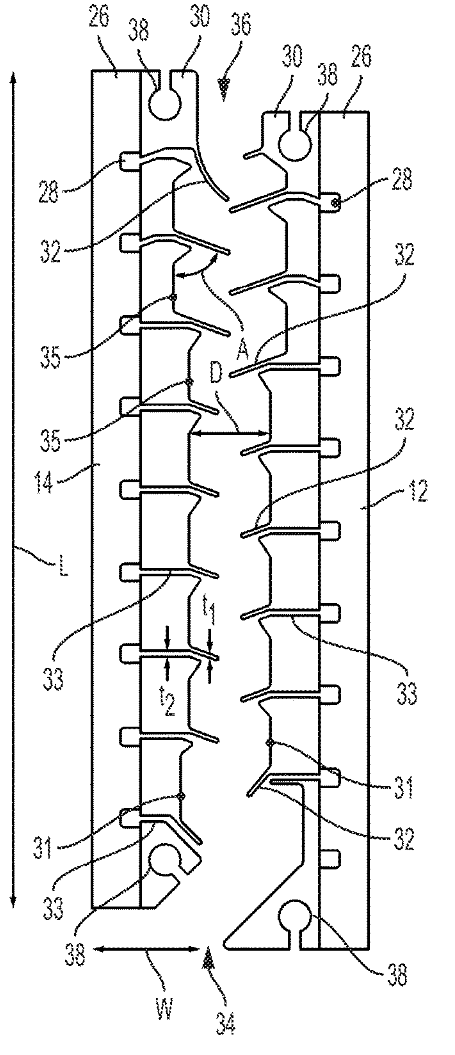
FIG. 4A depicts a side elevation view of the dynode arrays of the DDEM of FIG. 2.

FIG. 4A depicts a side elevation view of the dynode arrays 12 and 14 of the DDEM 10. Arrays 12 and 14 together form an input 34 at one end of DDEM 10 through which ions (electrons) are distributed into DDEM 10, and an output (anode) 36 at an opposite end of DDEM 10 at which the ions (electrons) are collected.

Each dynode array 12 and 14 includes an insulator 26 and a conductor 30 that is mounted to the insulator 26. Either one or both conductors 30 may be formed from a single, unitary, monolithic block of conductive material, such as KOVAR®, for example. In other words, the conductors 30 of both arrays 12 and 14 may be formed from the same single, unitary, monolithic block of conductive material. Insulators 26 may be formed of any insulative material known to those skilled in the art, such as ceramic, for example.

Each insulator 26 has a series of slots 28 (9 shown) that are uniformly disposed on the side of the insulator 26 that faces the conductor 30. Each slot 28 extends along the entire depth ‘D’ of the insulator 26, and along a portion of the width ‘W’ of the insulator 26.

Each conductor 30 includes a series of ion-optics geometrical structures in the form of alternating fingers 32 and kerfs 33 (i.e., channels or slits). Each finger 32 is a thin slice of metal that extends along the entire depth ‘D’ of the conductor 30, and along at least a portion of the width ‘W’ of the conductor 30. The length of each finger 32 may vary. Each finger 32 extends from the emission surface 35 of the conductor 30 by a defined angle ‘A’ (e.g., from 0 to 90 degrees). Each finger 32 may be substantially straight (see the fingers 32 at the inlet end 34) or it may be curved (e.g., see the finger 32 at the outlet end 36 of array 14). The smallest dimension $t_1$ of each finger 32 may be less than 1 millimeter.

Each kerf 33 extends along the entire depth ‘D’ of the conductor 30, and along at least a portion of the width ‘W’ of the conductor 30. The base of each kerf 33 is substantially aligned with a respective slot 28 of the insulator 26. Each kerf 33 may be substantially straight, bi-directional (e.g., see the kerf 33 at the inlet end of array 14), or curved, for example. The smallest dimension $t_2$ of each kerf 33 may be less than 1 millimeter.

Figure 4B:
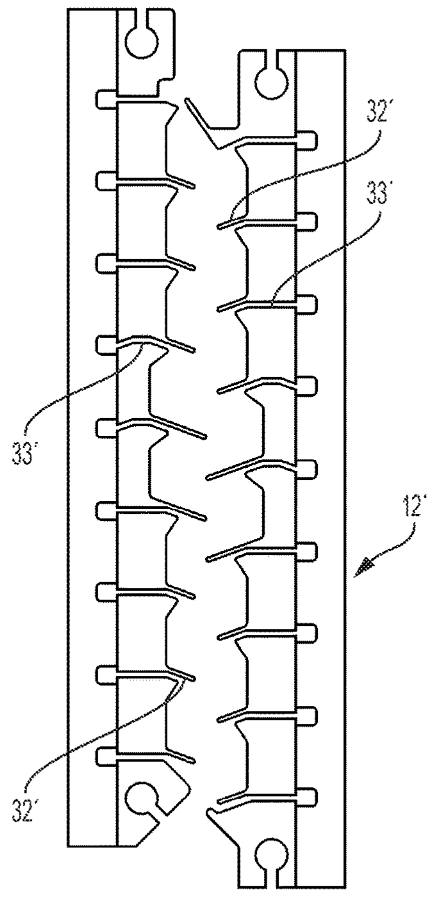
FIG. 4B depicts a side elevation view of alternative dynode arrays for a DDEM of FIG. 2.

The position and geometrical structure (i.e., size and shape) of the fingers 32 and kerfs 33 are tailored to achieve a desired result, such as splitting electrons for dual mode applications or achieving rapid electron pulse response for applications where timing may be critical. The geometrical structure is designed to reduce ion feedback, while the rest of the dynode structure is designed to maximize electron transmission. It should be understood that the position and geometrical structure of the fingers 32 and kerfs 33 can vary greatly. FIG. 4B, for example, depicts a side elevation view of alternative dynode arrays 12' and 14' for a DDEM including conductor channels 32' and kerfs 33' having their own unique geometries.

Two openings 38 are disposed on opposing sides of each conductor 30, through which the fasteners 20 are inserted upon assembling DDEM 10. Each circuit board 16 and 18 also includes openings either at or near all four corners for receiving the fasteners 20. The holes in the circuit board 16 and 18 and the conductors 30 are positioned and sized for precision alignment of the arrays 12 and 14 with respect to one another such that the distance ‘D’ (see FIG. 4A) between the conductors 30 is maintained at a tight tolerance.

A secondary electron emissive layer 31 is applied to the exterior surfaces of conductors 30 including the emission surfaces 35. The layer 31 is capable of generating secondary electrons with a coefficient of greater than one. The layer 31 may be composed of $Al_2O_3$, MgO, or $SiO_2$, for example. The layer 31 could be applied to the exposed surfaces of conductors 30 by processes such as physical vapor deposition (PVD), chemical vapor deposition (CVD) or atomic layer deposition (ALD), for example, or the layer 31 may be a thermally grown oxide. Another layer of metal material could be deposited onto the exposed surfaces of conductors 30 prior to depositing the emissive layer in order to enhance the performance of the DDEM 10.

Two circuit boards 16 and 18 are mounted to opposing length-wise sides of the arrays 12 and 14 such that the circuit boards 16 and 18 face each other in the assembled configuration of DDEM 10. The circuit boards 16 and 18 may be composed of ceramics, glass epoxy, or any other material known to those skilled in the art.

The circuit created by circuit boards 16 and 18 provides an electric field in operation. An electrical circuit driver including a chain of resistors are fabricated on circuit board 16 using active and/or passive electrical components having standard or surface mount type configurations. Circuit board 18 provides an output signal connector for electron collection, which is isolated from the environment of the circuit driver of circuit board 16 to limit pick-up noise.

In lieu of circuit boards 16 and 18, a mechanical frame or series of posts may be used to connect the arrays 12 and 14, and the circuitry including the voltage divider network could be integrated directly on the insulators 26.

Also, the DDEM 10 is not limited to the rectangular shape shown. The DDEM may be circular, square, annular, U-shaped or L-shaped.

Described hereinafter is a method of manufacturing and assembling the DDEM 10.

As a first step, the slots 28 are formed in the insulators 26 by one or more machining techniques that are capable of cutting thin dimensions (e.g., $t_1$ and $t_2$) of less than 1 millimeter. Such machining techniques include, for example, electrical discharge machining (EDM), laser cutting, water jet cutting, plasma cutting, flame cutting, or any combination thereof. Alternatively, the slots 28 may be formed at the third step.

As a second step, a block of conductive material (e.g., KOVAR®), which will eventually constitute conductor(s) 30, is joined to either one or both insulators 26 by brazing, adhesive bonding, or diffusive bonding, for example. Either one block of conductive material may be used to form both conductors 30 of arrays 12 and 14 (in which case the single block of material would be bonded to both insulators 26) or each conductor 30 may be formed from its own block of material (in which case one block of material would be bonded to a single insulator 26).

As a third step, the conductors 30 including all of their fingers 32, kerfs 33 and openings 38 are formed in the block(s) of conductive material by one or more machining techniques that are capable of cutting thin dimensions (e.g., $t_1$ and $t_2$) of less than 1 millimeter. Such machining techniques include, for example, electrical discharge machining (EDM), laser cutting, water jet cutting, plasma cutting, flame cutting, or any combination thereof. Traditional machining techniques have historically been incapable of achieving cut dimensions of less than 1 millimeter, but the invention in its broadest form is not necessarily limited to any particular machining technique. The input and output ends of the arrays 12 and 14 are also formed at this stage. As noted above, the slots 28 in the insulators 26 may also be formed at this stage instead of step 1.

The above-described machining techniques offer unmatched precision in achieving precise dynode geometry and position with a great level of reproducibility, and without the need for complicated fixturing devices during the assembly phase. Another advantage of the above machining techniques is that design changes for different DDEM applications are relatively simple to execute because they merely require machine programming changes. Yet another advantage is that the above-described machining techniques offer design flexibility in tuning the device for various applications such as dual mode (analog and counting) and fast response pulse application As a fourth step, the emissive layer 31 is formed on the exposed surfaces of the conductors 30. As noted above, the layer 31 could be applied to the exposed surfaces of conductors 30 by processes such as physical vapor deposition (PVD), chemical vapor deposition (CVD) or atomic layer deposition (ALD), for example, or the layer 31 may be a thermally grown oxide. The arrays 12 and 14 are now ready for assembly.

As a fifth step, the circuit boards 16 and 18 are assembled onto the arrays 12 and 14 using the fasteners 20, nuts 22 and washers 24 to form the assembled DDEM 10 shown in FIG. 2. DDEM 10 comprises less individual parts than prior art DDEM's, which is ideal from the assembly, labor, supply chain and quality assurance perspectives. DDEM 10 may be used in a mass spectrometer, for example.

The electronic driver (circuit board) may be configured to be mounted in various ways and positions with respect to the two arrays in order to either perform a single or a multiplexed collection of a signal.

Although the invention is illustrated and described herein with reference to specific examples, the invention is not intended to be limited to the details shown. Rather, various modifications may be made in the details within the scope and range of equivalents of the claims and without departing from the invention.

What is claimed is:

1. A process of manufacturing a discrete-dynode electron multiplier (DDEM) comprising the steps of:

(a) mounting a first insulator block to a first monolithic conductor block to form a first dynode array;

(b) forming a series of slots in the first insulator block;

(c) forming a series of ion-optics geometrical structures in the first monolithic conductor block, each ion-optics geometrical structure of the first monolithic conductor block having a smallest dimension of less than 1 millimeter and corresponding in position to one slot of the series of slots in the first insulator block;

(d) mounting a second insulator block to a second monolithic conductor block to form a second dynode array;

(e) forming a series of slots in the second insulator block;

(f) forming a series of ion-optics geometrical structures in the second monolithic conductor block, each ion-optics geometrical structure of the second monolithic conductor block having a smallest dimension of less than 1 millimeter and corresponding in position to one slot of the series of slots in the second insulator block; and (g) mounting the first dynode array to the second dynode array to form the DDEM, such that the ion-optics geometrical structures of the dynode arrays face each other and are spaced apart by a pre-determined distance to form an input end of the DDEM, an output end of the DDEM, and an ion path between the input end and the output end.

2. The process of claim 1, wherein the forming steps are performed by electrical discharge machining (EDM), laser cutting, and/or water jet cutting.

3. The process of claim 1, wherein each series of ion-optics geometrical structures comprises a series of alternating fingers and slots.

4. The process of claim 3, wherein one of the fingers and/or slots is curved in a direction along the smallest dimension.

5. The process of claim 1, wherein the mounting step (a) comprises either bonding or brazing the first conductor block to the first insulator block.

6. The process of claim 1, wherein the step (c) of forming further comprises the step of forming an opening in the first conductor block.

7. The process of claim 6 further comprising mounting a circuit board to the DDEM by positioning a fastener through the opening in the first conductor block and through an opening in the circuit board.

8. The process of claim 1, the method further comprises the step of applying a secondary electron emissive layer to exposed surfaces of the conductor blocks.

9. The process of claim 1, wherein each ion-optics geometrical structure of the first monolithic conductor block corresponds in position to one slot of the series of slots in the first insulator block.

10. The process of claim 1, wherein each slot extends only partially through a thickness dimension of the respective insulator block.

* * * * *